United States Patent
Corliss et al.

(10) Patent No.: US 9,003,925 B2
(45) Date of Patent: Apr. 14, 2015

(54) TWIN ELECTRONIC TORQUE MANAGEMENT DEVICE

(75) Inventors: Brenten Corliss, Royal Oak, MI (US); Samuel Oram, Auburn Hills, MI (US); Joseph Palazzolo, Commerce Township, MI (US); Matthew Schmalenberg, Roseville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 280 days.

(21) Appl. No.: 13/570,601

(22) Filed: Aug. 9, 2012

(65) Prior Publication Data
US 2013/0199334 A1    Aug. 8, 2013

Related U.S. Application Data

(60) Provisional application No. 61/522,008, filed on Aug. 10, 2011.

(51) Int. Cl.
*F16H 48/19* (2012.01)
*F16H 37/06* (2006.01)
*B60K 17/35* (2006.01)

(52) U.S. Cl.
CPC ......... *F16H 37/065* (2013.01); *Y10T 74/19014* (2015.01); *Y10T 74/19074* (2015.01); *Y10T 74/19005* (2015.01); *B60K 17/35* (2013.01); *F16H 48/19* (2013.01)

(58) Field of Classification Search
CPC ..... F16H 48/14; F16H 48/142; F16H 48/147; F16H 48/19
USPC ...................................... 74/424, 650
See application file for complete search history.

(56) References Cited

U.S. PATENT DOCUMENTS

| 2,179,923 | A | * | 11/1939 | De Lavaud | 74/650 |
| 2,397,673 | A | * | 4/1946 | Lewis | 180/24.03 |
| 5,189,930 | A | * | 3/1993 | Kameda | 74/650 |
| 5,540,119 | A | * | 7/1996 | Hudson | 74/650 |
| 5,964,126 | A | * | 10/1999 | Okcuoglu | 74/650 |
| 6,012,560 | A | * | 1/2000 | Kuroda et al. | 192/35 |
| 6,533,090 | B2 | * | 3/2003 | Osborn et al. | 192/48.2 |
| 6,622,837 | B2 | * | 9/2003 | Ochab et al. | 192/35 |
| 6,779,420 | B2 | * | 8/2004 | Peura | 74/650 |
| 7,584,832 | B2 | * | 9/2009 | Baasch et al. | 192/48.2 |
| 2007/0286743 | A1 | * | 12/2007 | Ochab et al. | 417/313 |

* cited by examiner

*Primary Examiner* — William C Joyce
(74) *Attorney, Agent, or Firm* — Jennifer M. Brumbaugh; Reising Ethington P.C.

(57) ABSTRACT

An axle module may comprise an outer housing and a ring gear assembly rotatably supported within the outer housing on a hub. The axle module may further include first and second shafts arranged within the ring gear assembly, and first and second inner hubs rotatably fixed to the first and second shafts, respectively. Additionally, the axle module may include first and second clutch packs, each having a first plurality of friction plates fixed for rotation to the first and second inner hubs, and a second plurality of friction plates fixed for rotation to the hub. Exemplary axle modules may have a reduced packaging width.

17 Claims, 6 Drawing Sheets

TWIN ELECTRONIC TORQUE MANAGEMENT DEVICE

CROSS-REFERENCE TO RELATED APPLICATIONS

This Application claims the benefit of U.S. Provisional Application 61/522,008 filed on Aug. 10, 2011, the contents of which are hereby expressly incorporated by reference in their entirety.

BACKGROUND

Torque distribution systems in automotive vehicles may control division of torque between two axle shafts by way of a torque transfer coupling.

Generally, when one of the axle shafts starts to slip, such systems typically apply a greater portion of torque the other axle shaft until the appropriate wheel torque is achieved. More specifically, when the wheel associated with the axle shaft is on a slick road condition or loose gravel, the wheel may initially lose traction. The system subsequently applies a greater portion of the available torque, e.g., received from a propeller shaft, to the other axle shaft, thereby improving traction. Additionally, electronic controls may be employed to selectively balance torque application between the two axle shafts and allowing a greater degree of control and/or intervention.

Known twin electronic torque distribution systems generally are bulky and are difficult to package in a vehicle, especially in view of the desire to maintain identical or similar packaging widths of the overall system within a vehicle. In particular, known dual electronically controlled torque distribution systems require added width to accommodate the additional size required to fit the two separate electronic control systems, including the clutch packs and associated activation devices. The increased cross-vehicle width of these electronically controlled torque distribution systems makes provision of such systems as an option on a vehicle difficult, as manufacturers have a strong preference for maintaining commonality to the extent possible across all options associated with a vehicle line. Additionally, the increased cross-vehicle width causes the inboard side shaft joints to be positioned or shifted towards the wheel, leading to packaging conflicts with chassis components and an increase in joint angles of the axle shafts, decreasing efficiency of the system and durability of system components, e.g., constant velocity joints.

Therefore, there is a need for an axle module that includes an integration of two electronically controlled axle shafts into a smaller package in order to allow for a greater number of practical applications of this technology. Additionally, there is a need for reduced weight and lower side shaft joint angles within the torque distribution system to increase durability and provide appropriate traction performance for all wheel drive systems.

SUMMARY

Various exemplary illustrations are provided herein of an axle module comprising an outer housing, and a ring gear assembly rotatably supported within the outer housing on a hub. The axle module may further include first and second shafts arranged within the ring gear assembly, and first and second inner hubs rotatably fixed to the first and second shafts, respectively. Additionally, the axle module may include first and second clutch packs, each having a first plurality of friction plates fixed for rotation to the first and second inner hubs, and a second plurality of friction plates fixed for rotation to the hub. Exemplary axle modules may have a reduced packaging width, for example as a result of the hub structure defining separate cavities for the first and second clutch packs. In other examples, a reduced width is provided by at least partially nesting bearings of the first and second shafts. In yet other examples, a differential bearing between the outer housing and the hub may abut bearings associated with other components of the axle module, thereby reducing packaging width of the axle module.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
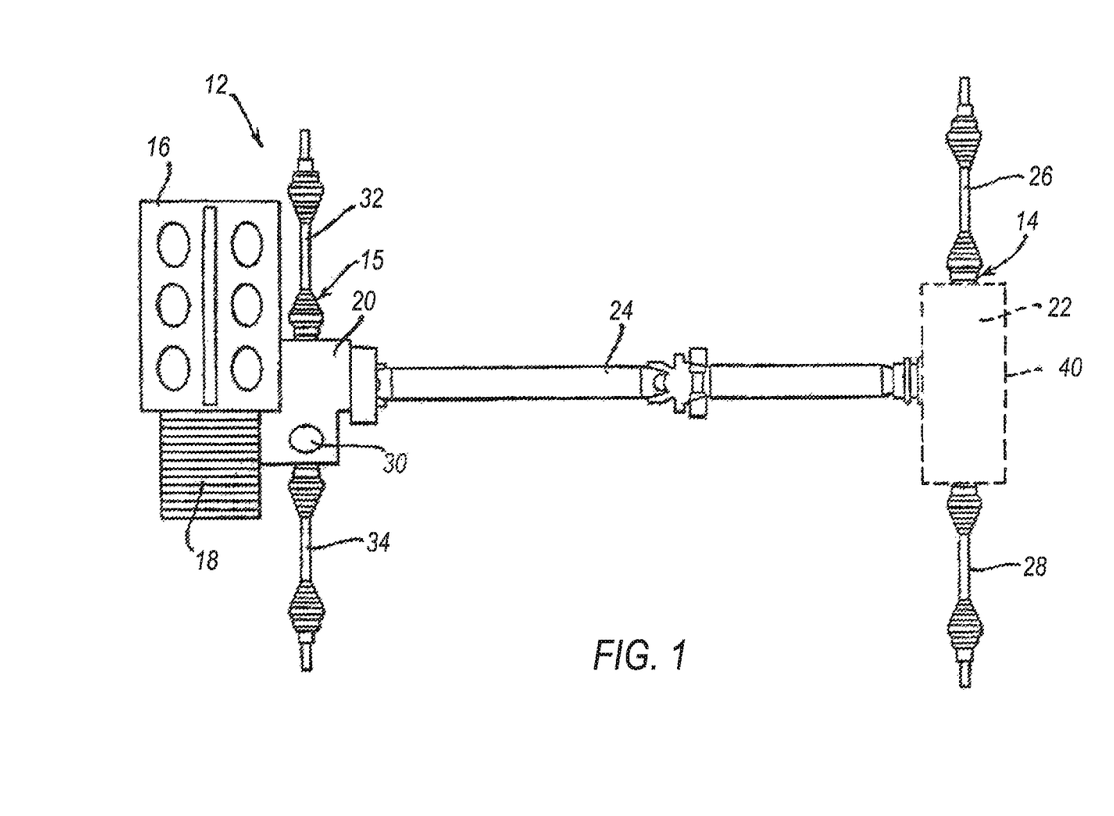
FIG. 1 is a plan view of a vehicle drivetrain having an exemplary axle module.

Referring now to FIG. 1, an exemplary axle module 22 is shown. FIG. 1 schematically illustrates an all wheel drive or four wheel drive motor vehicle 12 that is primarily front wheel driven; however, deployments on a primarily rear wheel driven vehicle are possible, even likely.

A motor vehicle 12 as shown in FIG. 1 may be permanently driven by a front axle 15. The motor vehicle 12 is driven by power transferred from the engine 16 through a transaxle or gear box 18, which may include an automatic or manual gear box, merely as examples. Power may be transferred from the gear box 18 to a power take off 20 of the drivetrain assembly, and subsequently to a front differential 30. Upon demand, power may be transferred to the rear axle module 22 via a propeller shaft or driving shaft 24. At the rear axle module 22, power may generally split to a left hand rear side shaft 26 and a right hand rear side shaft 28 for distribution to wheels at the rear of the vehicle. A front differential or front axle module 30 distributes torque between the left hand front side shaft 32 and the right hand front side shaft 34. In an all wheel drive vehicle, power may be delivered to both the rear axle module 22 and the front differential 30 in such a manner that the front axle 15 is a primarily driven axle, while the rear axle 14 selectively receives power when needed. According to one exemplary implementation, an all wheel drive vehicle may have torque distributed to each wheel of the secondary axle in an independent manner depending on which wheels are in a slip condition or in a non-slip condition with respect to the road. The exemplary axle module 22 may be employed in either the front or rear axle of an all wheel drive unit, or even in both the front and rear axle.

The axle module 22 may include an outer housing 40. One end of the prop shaft 24 may include a pinion gear (not shown) fixed to the prop shaft 24 for rotation therewith, and which is rotatably supported by the outer housing 40. The prop shaft 24 may provide power sufficient to spin the side shafts 26, 28 and each wheel by way of a ring gear assembly 44 (not shown in FIG. 1). The pinion gear (not shown) may be attached to one end of the propeller shaft 24 of the drivetrain system, and may be rotatably supported by the housing 40 and a bearing. The propshaft 24 may rotate with a speed that is proportional to the average front wheel speed, with a constant of proportionality that is equal to any reduction ratio, e.g., from gearing associated with the vehicle. The pinion gear 42 rotating at this speed will rotate the ring gear assembly 44 (not shown in FIG. 1), as further described below, thus providing the rotary motion necessary for the axle module 22 to provide power to the side shafts 26, 28.

Figure 2:
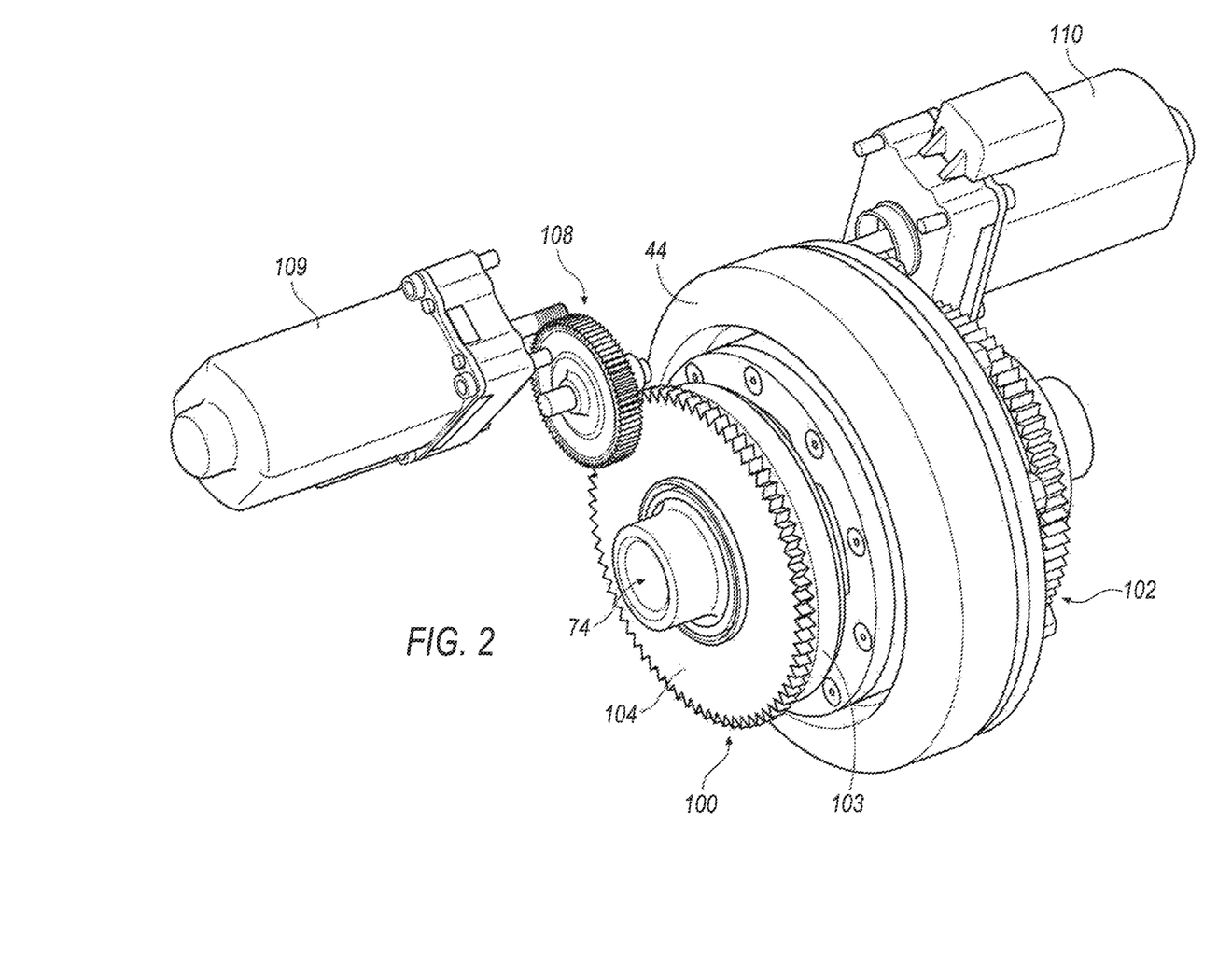
FIG. 2 is a perspective view of an exemplary ring gear assembly of the axle module of FIG. 1.
Figure 3:
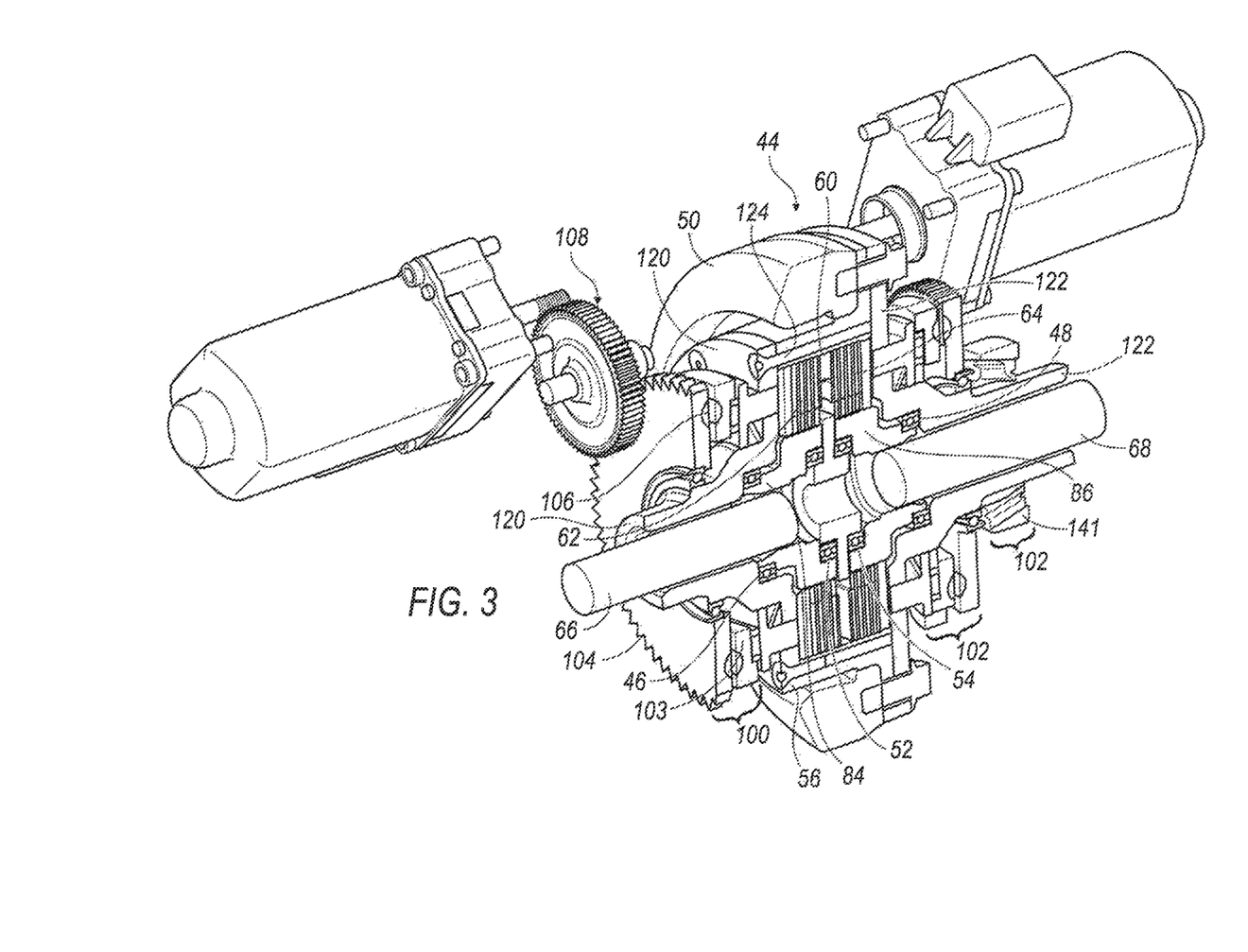
FIG. 3 is a partial cutaway perspective view of the exemplary ring gear assembly of FIG. 2.
Figure 4:
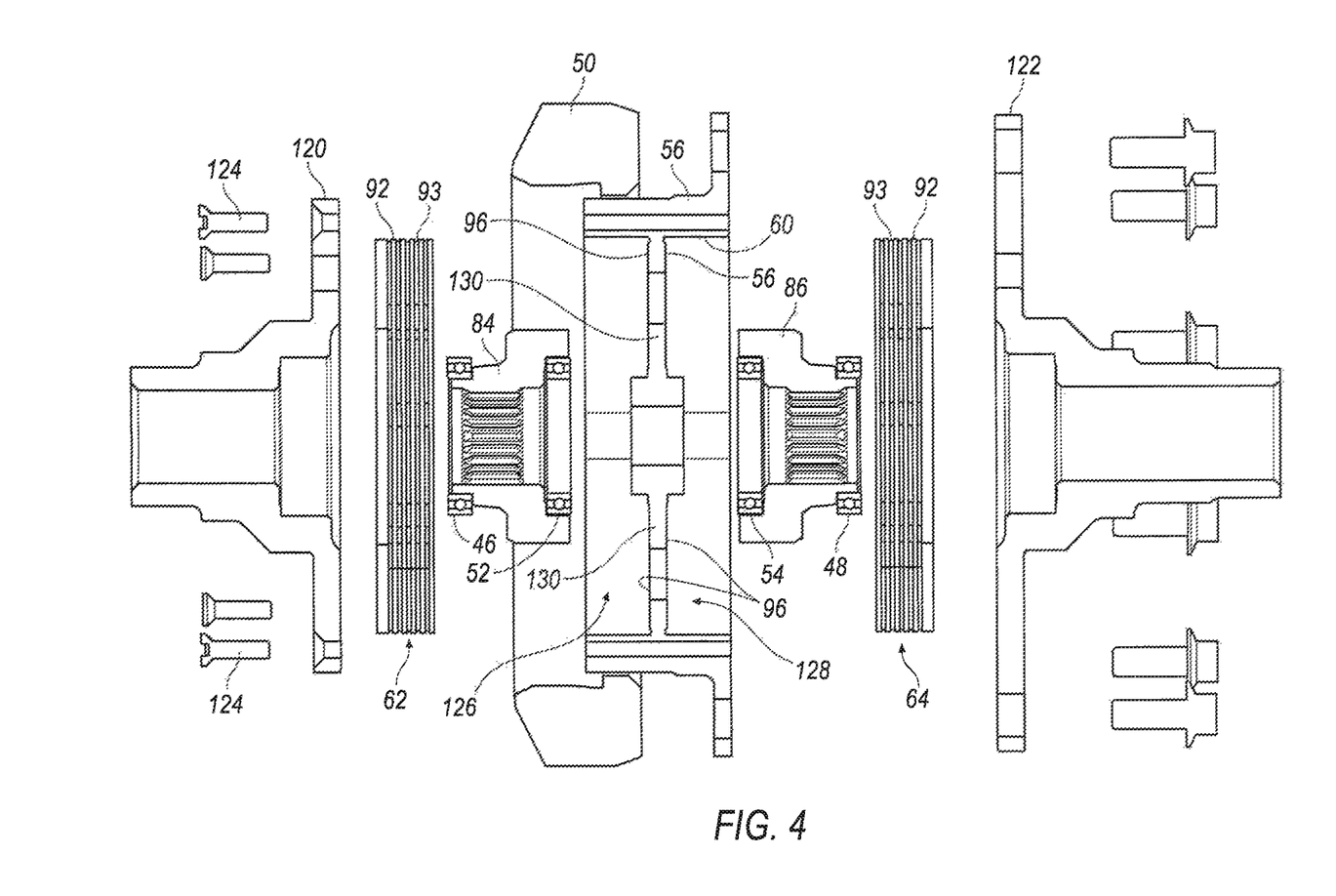
FIG. 4 is an exploded cross sectional view of the exemplary ring gear assembly of FIGS. 2 and 3.

FIGS. 2-4 show exemplary interior components of the axle module 22 within the outer housing 40. The ring gear assembly 44 is rotatably supported within the housing 40 by a first set of bearings 52 and second set of bearings 54. The ring gear assembly 44 has a ring gear 50 attached to an outer surface thereof such attachment may be effected by any known mechanism. The ring gear assembly 44 generally includes a three-piece outer hub 56. The outer hub 56 generally includes opposing end caps 120, 122 that are secured to an outer face of the hub 56, e.g., with a plurality of bolts 124, as will be described further below. The end cap 120, 122 may alternatively be welded to the outer hub. A bolted design may generally facilitate service of the clutch packs 62, 64, however a welded and thus non-serviceable design may be desired for some applications. The outer hub 56 of the ring gear assembly 44 is supported by the first 46 and second bearing 48. The outer hub 56 helps in supporting the first side shaft 26 and second side shaft 28 in each end thereof. The outer hub 56 also includes a spline 60 on an inside surface thereof such that a first 62 and second clutch pack 64 engage with the spline 60. The outer hub 56 may be supported in the outer housing 40 via elongated portions of the end caps 120, 122, via bearings. For example, a differential bearing 141 (not shown in FIGS. 2-4) may be provided that supports end cap 122 within the outer housing 40.

As best seen in FIG. 3, a first stub shaft 66 and a second stub shaft 68 may be arranged within the ring gear assembly 44. The first and second stub shafts 66, 68 may have a plurality of teeth on an outside surface thereof, e.g., for engaging an integral side shaft in one end thereof. The stub shafts 66, 68 also may include an orifice (not shown) through a centerline of the stub shaft that is generally cylindrical in shape. Constant velocity or side shaft joints (not shown) may receive and rotatably secure the side shafts 26, 28 (not shown in FIGS. 2-4) on each end thereof, with the side shafts 26, 28 then connecting to respective wheels on their opposite ends.

A first 84 and second inner hub 86 are then arranged around the first 66 and second stub shafts 68, respectively. The inner hubs 84, 86 have a plurality of teeth on an inner surface thereof which mate with and are rotatably fixed with the teeth on the outer surface of the stub shafts 66, 68. This allows the inner hubs 84, 86 to spin with the stub shafts 66, 68. The inner hubs 84, 86 may be axially fixed to the outer surface of the stub shafts 66, 68.

Clutch packs 62, 64 are arranged within the ring gear assembly 44. The clutch packs 62, 64 are arranged such that they engage the spline 60 on the outer hub 56 of the ring gear assembly 44 on an outer circumference thereof. The clutch packs 62, 64 engage a spline of the inner hubs 84, 86 on the inner circumference of the clutch packs 62, 64. The clutch packs 62, 64 include a plurality of friction plates 92, 93 alternately arranged and alternately connected to either the outer hub 56 or the inner hubs 84, 86 of the ring gear assembly 44. The plurality of plates 92 that are connected to the inner hubs 84, 86 are rotatably connected to the inner hubs 84, 86 via a spline. This will keep the friction plates 92 that are connected to the inner hubs 84, 86 rotatably fixed with respect to the inner hubs 84, 86 while allowing for axial movement of the friction plates 92 along the outer surface of the inner hubs 84, 86. The friction plates 93, which in an alternating sequence with the plates 92 connected to inner hubs 84, 86, are connected to the outer hub 56, and are rotatably fixed with respect to the outer hub 56 by the spline 60. The friction plates 93 connected to the outer hub 56 are capable of axial movement along the outer hub 56 inner surface. The clutch packs 62, 64 are in contact with the outer hub 56 of the ring gear assembly 44 on one side thereof and with thrust surfaces 96 defined by the hub 56 on the opposite side thereof, in a central portion of the hub 56. Therefore, the inner hubs 84, 86 and stub shafts 66, 68 are both capable of axial movement within the outer hub 56 of the ring gear assembly 44.

In operation, the clutch packs 62, 64 which are connected to the first and second inner hub 86, respectively, are compressed against the thrust surfaces 96 such that the friction plates 92, 93 for each clutch pack compresses and creates friction between the alternating plates 92, 93, thus creating a torque transfer from the outer hub 56 and input pinion gear 42 to one or both of the inner hubs 84, 86 of the stub shafts 66, 68.

In one exemplary implementation, a first expansion device 100 and a second expansion device 102 are arranged between the first 66 and second stub shaft 68 and the ring gear assembly outer hub 56. The expansion devices 100, 102 in one implementation include a ball ramp expansion mechanism. However, any other type of expansion mechanism such as one that uses inclined surfaces and/or any other type of mechanism that can convert rotary motion into an axial force or motion can be used.

Ball ramp expansion mechanisms 100, 102 may generally mirror each other with respect to the axle module 22. Accordingly, while ball ramp expansion mechanism 100 is described in further detail below, the description of ball ramp mechanism 100 is generally applicable to ball ramp mechanism 102, and vice versa. Ball ramp mechanism 100 may generally include a first ramp 103 and a second ramp 104, with a plurality of balls 106 dispersed therebetween. The first ramp 103 is fixed, e.g., with respect to the housing 40, while the second ramp 104 engages a gear set 108. The gear sets 108 also engage with drive motors 109, 110. It should be noted that first 109 and second motors 110 are used to independently control the first clutch pack 62 and second clutch pack 64, respectively. A needle or thrust bearing 112 may be located between the first ramp 103 of the ball ramp expansion mechanism and a pressure member A, which in turn forces the friction plates 92, 93 of clutch pack 64 together. Accordingly, this may generally allow for easier rotation of the second ball ramp 104 when the drive motors 109, 110 delivers the rotary force to the second ball ramp 104. The gear set 108 may be used such that the response time of the motors 109, 110 is reduced, by multiplying rotational force applied by the drive motors 108, 110.

The drive motors 109, 110 may be independently activated by a controller (not shown). The controller may employ an algorithm and sensor inputs to sends current to the drive motors 109, 110 based on need. More specifically, once the controller/algorithm determines if a wheel is in a slip condition the controller will send the necessary signal to the drive motors 109, 110 which will then transmit the necessary rotational torque to activate either or both of the clutch packs 62, 64. The drivetrain system thus has the capability of each independent motor 109, 110 being separately regulated by a controller of the vehicle, e.g., an automotive vehicle. Hence, torque transmission to each wheel may be independently controlled. In one example, the motors 109, 110 are attached to an outer surface of the axle module housing 40. It should further be noted that both the right hand 26 and left hand side shafts 28 can be actuated independently with each motor and in any range varying from a slight drag to maximum clutch pack capacity.

In operation, the axle module 22 and motors 109, 110 may be independently actuated by the controller. Generally, each side shaft 26, 28 and associated wheel of an automotive vehicle will have a plurality of sensors monitoring numerous factors such as speed, wheel slip, whether brakes are being applied, steering angle, yaw rate, throttle, steering angle, and another other factors that affect the handling and traction of the automotive vehicle. For example, the controller may sense that a particular wheel is in a spin condition and then will activate the appropriate individual motor 109 or 110 to engage the appropriate clutch pack 62, 64. Accordingly, more torque may be transmitted from the propeller shaft 24 to the wheel that is in a non-slip condition. Thus, the vehicle may recover from the slip condition more quickly. More specifically, the motor 109 or 110 may activate and rotate the associated gear set 108, such that the second ramp 104 of the ball ramp unit will rotate a predetermined distance based on the gearing used in the gear set 108. The balls 106 may then engage with the first ramp 102 and create an axial force which separates the ramps 103, 104. This axial force is then transferred via the second ramp 104 to the pressure member A. The pressure member A will then move in an axial direction, thereby squeezing the clutch pack friction plates 92, 93 together against the thrust surface 96. When the friction plates 92, 93 come in contact with one another and compress into one another, the outer hub 56 of the ring gear assembly 44, which is spinning at the axle speed via the pinion gear and ring gear, will begin transferring that input torque through the friction plates 92, 93 to the inner hub 84. Accordingly, more torque is transmitted from the ring gear 50 to the side shaft 26, 28 corresponding to the side having that has the electric motor 108,110 engaged. Torque may thus be transmitted to a non-slipping wheel, helping to remove the vehicle from the slip condition.

Once the slip condition has been overcome, the motor 108 or 110 may be disengaged such that the ball ramp unit 98 or 100 is rotated in a reverse motion such that the first 103 and second ball ramps 104 define a narrower width, thus disengaging the friction plates 92, 93 and allowing the torque to be distributed evenly between the side shafts 26, 28. The side shafts 26, 28 may have an equilibrium speed at which they will spin when the clutch packs 62, 64 are not engaged.

In operation the motors 109, 110 can also act as an electronic cut off unit by disconnecting the clutch pack 62, 64 in an open position at all times, thus keeping the expansion devices 100, 102 at their narrowest positions, and allowing no torque transfer between the outer hub 56 and the inner hubs 84,86. Therefore, no torque is being sent to the wheels and the wheels roll along with the vehicle. The motors 109, 110 are also capable of allowing only a certain percentage of power to be sent to each wheel depending on the road conditions and what is being sensed by the on board computer sensors.

Therefore, at equilibrium conditions the secondary axle side shafts 26, 28 may spin at axle speed and the pinion gear 42 will be spinning the ring gear 50, and hence the ring gear assembly 44, at axle speed, but there will be no torque or power transfer through the clutch packs 62, 64 until a condition occurs that requires more torque to be transferred.

As noted above, the hub 56 may comprise a three-piece assembly, as best illustrated in FIG. 4. The three-piece assembly, i.e., with the outer hub 56, and end caps 120, 122 on each side, may generally reduce overall width of the axle module 22. More specifically, the hub 56 defines opposing cavities 126, 128 for each of the clutch packs 62, 64. The opposing cavities 126, 128 are separated by a central wall 130. The central wall 130 may define the thrust surfaces 96 for the clutch packs 62, 64. The central wall 130 may be fixed to, and also may be integrally formed with, the hub 56. The central wall 130 thus provides a fixed support for each of the clutch packs 62, 64. Moreover, the fixed support of the central wall 130 not only provides thrust surface 96 for the clutch packs, but also, each side of the hub 56 may be assembled separately. In other words, the clutch packs 62, 64 may be removed from their corresponding cavities 126, 128, e.g., for service, without requiring disassembly of the other clutch pack 64, 62, respectively. Accordingly, the central wall 130 allows each side of the unit, i.e., the clutch packs 62, 64 to be assembled and disassembled independently. Moreover, common tooling may be employed that decreases the overall width and cost of the axle module 22.

Figure 5:
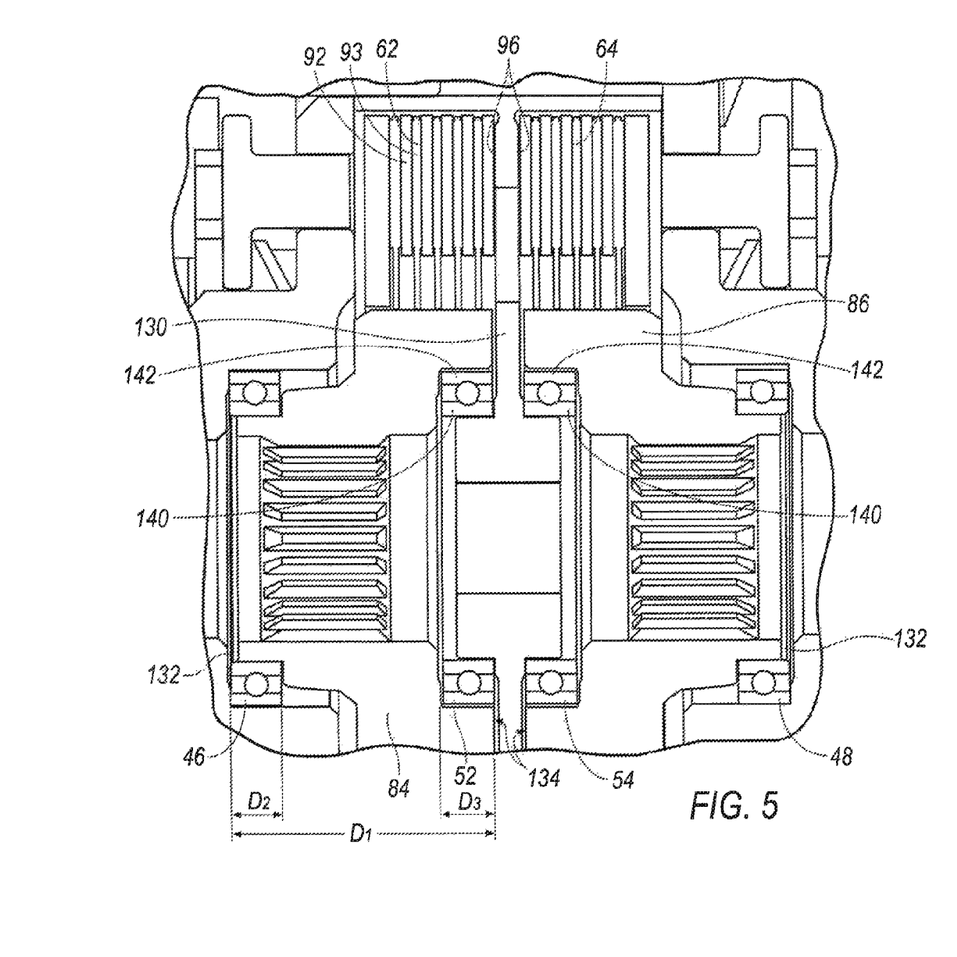
FIG. 5 is an enlarged portion of the cross sectional view of the exemplary ring gear assembly of FIGS. 2-4.

As best illustrated in FIG. 5, the bearings 52, 54 of the inner hubs 84, 86, respectively, may be nested at least partially within the inner hubs 84, 86. In the exemplary implementation shown in FIG. 5, the bearings 52, 54 of the inner hubs 84, 86, respectively, may be nested such that an axial width $D_3$ of the bearings 52, 54 (shown for bearing 52 in FIG. 5) is fully included within an axial distance $D_1$ defined by the inner hubs 84, 86 (shown for inner hub 84 in FIG. 5). The nesting of the bearings 52, 54 may generally further reduce packaging width of the axle module 22. Moreover, the reduction in width may allow the axle module to fit within the standard packaging space of a normal open differential. In the exemplary illustration of FIG. 5, the central wall 130 of the hub 56 is fixed to inner diameter portions 140 of each of the bearings 52, 54. Additionally, the inner hubs 84, 86 are fixed to outer diameter portions 142 of the same bearings 52, 54. In one exemplary illustration, the bearings 52, 54 each are disposed within an axially innermost surface 134 of the corresponding inner hub 84, 86, respectively. For each side, this may result in a space savings generally corresponding to the width of one of the bearings 52, 54. In one example, this reduces the width approximately 10 millimeters.

Bearings 46, 48 may also be partially or fully nested within the inner hubs 84, 86, e.g., on an outer portion of the inner hubs 84, 86. For example, as illustrated in the exemplary implementation of FIG. 5, bearings 46, 48 each define an axial width $D_2$ that is fully included within the axial width $D_1$ defined by the inner hubs 84, 86. In one exemplary implementation, the bearings 52, 54 each are disposed within an axially outermost surface 132 of the corresponding inner hub 84, 86, respectively. For each side, this may result in a space savings generally corresponding to the width of one of the bearings 46, 48.

Figure 6:
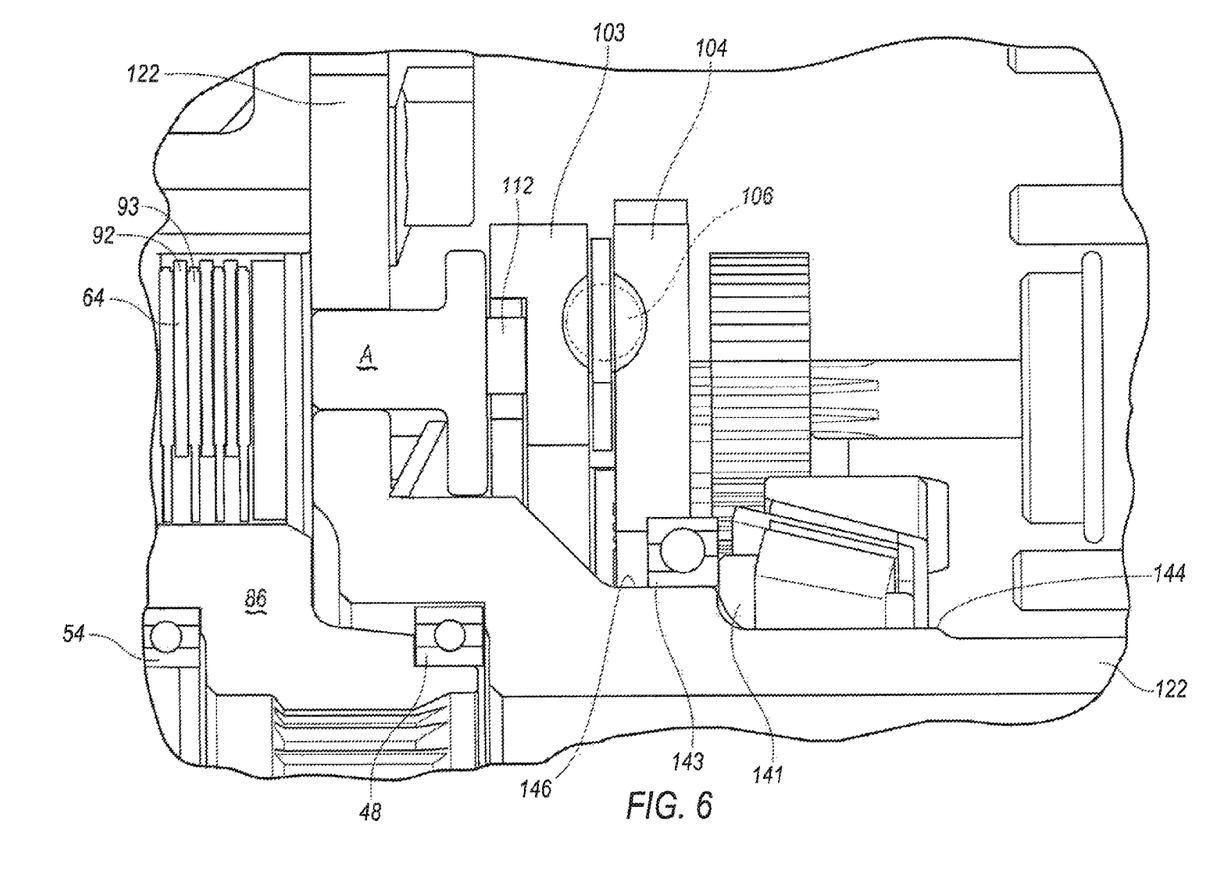
FIG. 6 is another enlarged portion of the cross sectional view of the exemplary ring gear assembly of FIGS. 2-4.

As noted above, the axle module 22 employs two clutch packs 62, 64 that are actuated by expansion devices 100, 102, which may include ball ramps 103, 104. As best seen in FIG. 6, the ball ramps 103, 104 have a ball ramp bearing 143 that is disposed on an outer portion of the housing end cap 122.

The ball ramp bearing 143 is retained by differential support bearings 140, which are disposed axially outside of the ball ramp bearings 143. Differential support bearings 140 may generally allow the hub 56 to rotate with respect to the outer housing 40 of the axle module 22. Accordingly, engagement between the differential bearings 140 and the ball ramp bearings 143 generally retains the ball ramp bearings 143, and prevents radially outward excursion of the ball ramp bearings 143. The differential support bearing 140 may be any type of bearing that is convenient. In the example shown in FIG. 6, the differential support bearing 140 is a tapered roller bearing. The use of the differential support bearing 140 may eliminate any need for additional parts, e.g., retaining rings, snap rings, etc. that might otherwise be required to retain the ball ramp bearings 143. In one exemplary illustration, each side of the axle module provides a reduced packaging width by approximately 5-6 millimeters.

The exemplary implementations disclosed herein may generally allow for reduced complexity of assembly, servicing using common tooling, and a reduced overall packaging width. In one exemplary illustration, the packaging width is reduced by about 30-32 millimeters, thereby allowing the axle module to fit within packaging spaces typically provided for a standard open differential.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A ring gear assembly, comprising:
   a hub having a central wall, the central wall defining a first cavity and second cavity on opposing sides of the central wall, the hub including first and second end caps;
   first and second inner hubs configured to be fixed to first and second shafts arranged within the ring gear assembly for rotation therewith;
   first and second clutch packs received within the first and second cavities, respectively, the first and second clutch packs each having a first plurality of friction plates fixed for rotation to the first and second inner hubs, the first and second clutch packs each having a second plurality of friction plates fixed for rotation to the hub;
   a first bearing disposed radially between the first inner hub and the first end cap, and a second bearing disposed radially between the second inner hub and the second end cap;
   a first expansion assembly and a second expansion assembly, the first and second expansion assemblies configured to transfer an axial load to the first and second clutch packs to selectively engage the first and second friction plates together, wherein the expansion assemblies include a ball ramp supported on a ball ramp bearing; and
   a first drive motor and a second drive motor configured to selectively actuate the first and second expansion assembly, respectively.

2. The ring gear assembly of claim 1, wherein the first and second end caps enclose the first and second cavities.

3. The ring gear assembly of claim 1, further comprising:
   an axle module comprising an outer housing receiving the ring gear assembly therein; and
   a differential bearing disposed on the outer housing and configured to allow the hub to rotate with respect to the outer housing.

4. The ring gear assembly of claim 3, wherein an inner diameter portion of the differential bearing abuts the ball ramp bearing.

5. The ring gear assembly of claim 1, further comprising an axle module comprising an outer housing receiving the ring gear assembly therein, the axle module including a differential bearing supporting the ring gear assembly for rotation within the outer housing.

6. The ring gear assembly of claim 1, further comprising first and second inner hub bearings disposed between the central wall and the first and second inner hubs, respectively, the first and second inner hub bearings configured to allow the first and second inner hubs to rotate with respect to the hub.

7. The ring gear assembly of claim 6, wherein the first and second hub bearings are disposed at least partially within the first and second inner hubs, respectively.

8. The ring gear assembly of claim 7, wherein the first and second inner hubs define axially innermost ends, and the first and second hub bearings are at least partially disposed axially outward of the axially innermost ends of the first and second inner hubs, respectively.

9. A ring gear assembly, comprising:
   a hub;
   first and second inner hubs configured to be fixed to first and second shafts arranged within the ring gear assembly for rotation therewith;
   first and second clutch packs received within first and second cavities of the hub, respectively, the first and second clutch packs each having a first plurality of friction plates fixed for rotation to the first and second inner hubs, the first and second clutch packs each having a second plurality of friction plates fixed for rotation to the hub housing; and
   first and second inner hub bearings disposed between the hub and the first and second inner hubs, respectively, the first and second inner hub bearings configured to allow the first and second inner hubs to rotate with respect to the hub; wherein the first and second hub bearings are disposed at least partially within the first and second inner hubs, respectively.

10. The axle module of claim 9, wherein the hub includes a central wall fixed to the hub, the central wall defining the first cavity and second cavity on opposing sides of the central wall.

11. The axle module of claim 9, further comprising a first expansion assembly and a second expansion assembly, wherein the first and second expansion assemblies are configured to transfer an axial load to the first and second clutch packs to selectively engage the first and second friction plates together.

12. The device of claim 11, further comprising a first drive motor and a second drive motor configured to selectively actuate the first and second expansion assembly, respectively.

13. The device of claim 11, wherein the expansion assembly includes a ball ramp supported on a ball ramp bearing.

14. The ring gear assembly of claim 13, further comprising:
an axle module comprising an outer housing receiving the ring gear assembly therein; and
a differential bearing disposed on the outer housing and configured to allow the hub to rotate with respect to the outer housing;
wherein an inner diameter portion of the differential bearing abuts the ball ramp bearing.

15. The device of claim 9, wherein the first and second inner hubs define axially innermost ends, and the first and second hub bearings are at least partially disposed axially outward of the axially innermost ends of the first and second inner hubs, respectively.

16. An axle module, comprising:
an outer housing;
a ring gear assembly rotatably supported within the outer housing on a hub;
first and second inner hubs configured to be fixed to first and second shafts arranged within the ring gear assembly for rotation therewith;
first and second clutch packs received within first and second cavities of the hub, respectively, the first and second clutch packs each having a first plurality of friction plates fixed for rotation to the first and second inner hubs, the first and second clutch packs each having a second plurality of friction plates fixed for rotation to the hub housing;
a first expansion assembly and a second expansion assembly, the first and second expansion assemblies each adjacent to the housing, wherein the first and second expansion assemblies are configured to transfer an axial load to the first and second clutch packs to selectively engage the first and second friction plates together; and
a differential bearing disposed on the outer housing and configured to allow the hub to rotate with respect to the housing;
wherein at least one of the first and second expansion assemblies includes a ball ramp supported on a ball ramp bearing, wherein an inner diameter portion of the differential bearing abuts the ball ramp bearing.

17. The axle module of claim 16, further comprising first and second inner hub bearings disposed between the hub and the first and second inner hubs, respectively, the first and second inner hub bearings configured to allow the first and second inner hubs to rotate with respect to the hub; wherein the first and second hub bearings are disposed at least partially within the first and second inner hubs, respectively.

* * * * *